(12) United States Patent
Brissette et al.

(10) Patent No.: US 6,384,634 B1
(45) Date of Patent: May 7, 2002

(54) ELASTIC STORE: RECOVERY AND BOUNDARY VERIFICATION

(75) Inventors: Patrice Brissette, Hull; Sandy W. A. Thomson, Ottawa, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/788,430

(22) Filed: Feb. 21, 2001

(51) Int. Cl.[7] .............................................. H03K 19/00
(52) U.S. Cl. .............................. 326/93; 326/40; 326/46
(58) Field of Search ............................. 326/46, 93, 40; 365/189.01, 221

(56) References Cited

U.S. PATENT DOCUMENTS 5,898,893 A  *  4/1999  Alfke ........................... 395/877
5,994,920 A  *  11/1999  Narayana et al. .............. 326/46
6,191,992 B1 *  2/2001  Komoto ........................ 365/221

OTHER PUBLICATIONS

Alfke, P., "Moving Data Across Asynchronous Clock Boundaries", 2000, <http://www.isdmag.com/editorial/2000/design/0003.html>, pp. 1–6.

* cited by examiner

*Primary Examiner*—Michael Tokar
*Assistant Examiner*—Anh Tran (57) ABSTRACT

When a FULL or EMPTY state of a First In First Out memory (FIFO) in an elastic store is detected by a verification and recovery circuit, a recovery operation is initiated, i.e., writing to or reading from the FIFO is disabled for a predetermined number of respective (write or read) clock cycles. This predetermined number of respective clock cycles is chosen to meet an objective of a maximal distance between read and write addresses. At boot-up time, after waiting a number of clock cycles, a verification operation is performed on the boundaries (write vs. read addresses). The verification operation requires that the recovery operation described above be initiated if the read and write addresses are equal or adjacent. The verification operation then continues for a number of clock cycles after which the elastic store moves to steady state operation. In steady state operation, the recovery operation is initiated only if the read and write addresses are equal. As well as at boot-up time, the verification operation is also performed after each recovery operation.

22 Claims, 5 Drawing Sheets

ELASTIC STORE: RECOVERY AND BOUNDARY VERIFICATION

FIELD OF THE INVENTION

The present invention relates to movement of data across asynchronous clock boundaries and, more particularly, to elastic storage operations. Further particularly, the invention relates to recovery and boundary verification for elastic storage operations.

BACKGROUND OF THE INVENTION

The purpose of an elastic store is to allow the movement of data across asynchronous clock boundaries. At a boundary between two clock domains, a clock associated with incoming data and a clock associated with outgoing data may have different periods. Alternatively, the two clocks may alternate from high to low at the same rate.

A FIFO (First In First Out) memory may be used as part of an elastic store between the two clock domains. This FIFO memory may be a dual port RAM (Random Access Memory) with independent address inputs and data ports for read and write. A true dual-port memory allows each port to operate independently. Each side (read and write) of the elastic store uses a continuously-running independent clock and data may be read or written to the elastic store after activating a read or write enable port.

A typical FIFO has many inputs and many outputs. The inputs are arranged to receive, for a write, a write address at a write address input, data to write at a write data input, a signal on a write enable port and a write clock. The inputs are arranged to receive, for a read, a read address at a read address input, a signal on a read enable port and a read clock. The output is arranged to transmit, for a read, the data that is read at the read address. In particular, while writing is enabled by the signal on the write line, a write operation is performed on the data received at the write data input at a write address received at the write address input. The write operation occurs as triggered by the write clock. Further, when a read is enabled by the signal on the read line, a read operation is performed on the data present at the read address received at the read address input. The read operation occurs as triggered by the read clock.

A well designed elastic store includes a write counter for providing a write address, at the write address input, for each write operation. Similarly, the elastic store includes a read counter for providing a read address, at the read address input, for each read operation. Following each write or read operation, the respective counter is incremented to the next value in a counter cycle. The write counter and read counter cycle through the same sequence of addresses.

In designing an elastic store, consideration must be given to avoidance of overflow or underflow conditions. Take, for example, an elastic store having a clock ratio (the ratio between the write clock and read clock periods) of 15:14 and 64 buffer addresses. In this case, the elastic store may perform 34 more write operations than read operations before the elastic store is full (overflow). Similarly, the elastic store may perform 30 more read operations than write operations before the elastic store is empty (underflow). With a ratio of 15 to 14, the worst case is that the elastic store will perform 16 more write operations (or read operations) than read operations (or write operations). This scenario assumes a write address of 0 and read address of 31 at the beginning (boot-up time or after several recoveries). Under ideal conditions then, the distance between the read address and the write address is not less than 15.

At boot-up time, i.e., when the elastic store is turned on, write and read clocks may not reach a steady functionality immediately. Unfortunately, the address supplied by the write counter and the address supplied by the read counter are unknown at boot-up time. Thus, the possibility exists that the read address and the write address are adjacent (i.e., if one counter is incremented, the value supplied by each counter may be equal). This is a potentially dangerous scenario. For example, if a slip occurs on one clock (jitter), the elastic store might go into an overflow condition (an attempt to write to a full—i.e., unread—memory address) or an underflow condition (an attempt to read from an empty memory address). The result of the elastic store having gone into an overflow or underflow condition, is that the elastic store can no longer handle data without corruption.

In one recovery scheme, an interrupt can be generated, as triggered by an overflow or underflow condition, and software can reset the elastic store. However, the elastic store in this recovery scheme can take a while to react. Furthermore, when the elastic store does react, the software may reset the elastic store at an inopportune time.

Clearly, there is a requirement for measures to avoid overflow or underflow. However, if overflow or underflow occurs despite the avoidance measures there is a requirement for a recovery method for returning the elastic store to a functional state.

SUMMARY OF THE INVENTION

A circuit is provided that attempts to avoid elastic store overflow or underflow through address boundary verifications. However, if the elastic store fails due to over flow or underflow, a method is provided for recovering elastic store functionality.

Advantageously, the elastic store can work alone, i.e., external assistance is not required to correct for failures. Further, the elastic store is fully programmable for flexibility.

In accordance with an aspect of the present invention there is provided a method of operating an elastic store, the elastic store including a First In First Out memory (FIFO) having a write address input and a read address input. The method includes determining a write address as supplied to the write address input, determining a read address as supplied to the read address input, detecting a state of the elastic store wherein the write address is adjacent to the read address and, responsive to the detecting the state, performing a recovery operation.

In accordance with another aspect of the present invention there is provided an elastic store including a First In First Out memory (FIFO) having a write address input and a read address input, a write counter for supplying a write address to the write address input of the FIFO, a read counter for supplying a read address to the read address input of the FIFO and a verification and recovery circuit for receiving a write address as supplied to the write address input, receiving a read address as supplied to the read address input, detecting a state of the elastic store wherein the write address is adjacent to the read address and, responsive to the detecting the state, performing a recovery operation.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
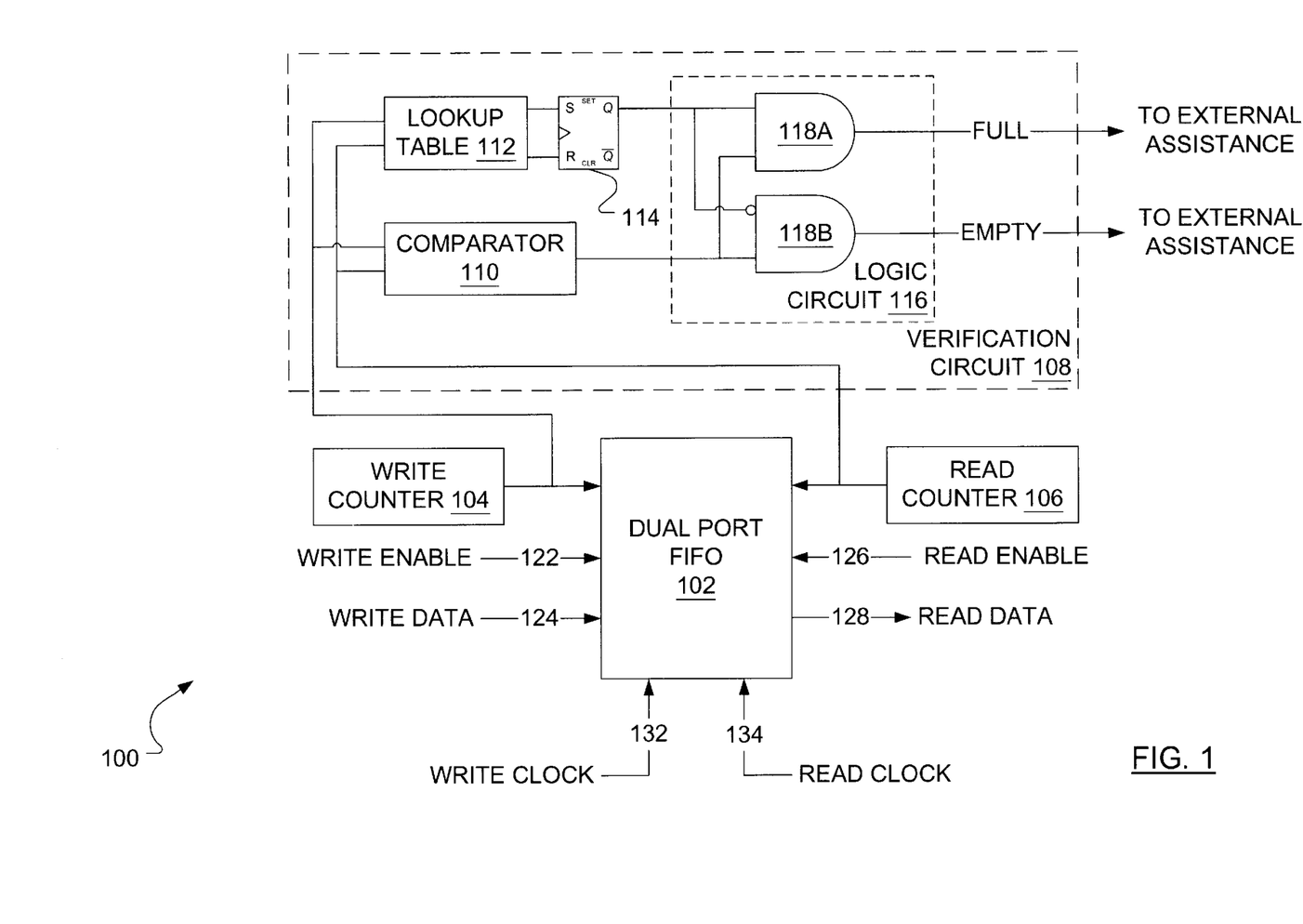
FIG. 1 illustrates a known elastic store.

FIG. 1 illustrates an elastic store 100 (as disclosed in Peter Alfke, "Moving Data across Asynchronous Clock Boundaries," http://www.isdmag.com/editorial/2000/design0003.html) including a dual port FIFO 102, a write counter 104, a read counter 106 and a verification circuit 108. The verification circuit 108 includes a comparator 110, a lookup table 112, an S-R latch 114 and a logic circuit 116. Additionally, the FIFO 102 receives input on a write enable port 122, a write data line 124 and a read enable port 126. The FIFO 102 transmits output on a read data line 128. The FIFO 102 also receives a write clock signal on a write clock line 132 and a read clock signal on a read clock line 134.

Figure 2:
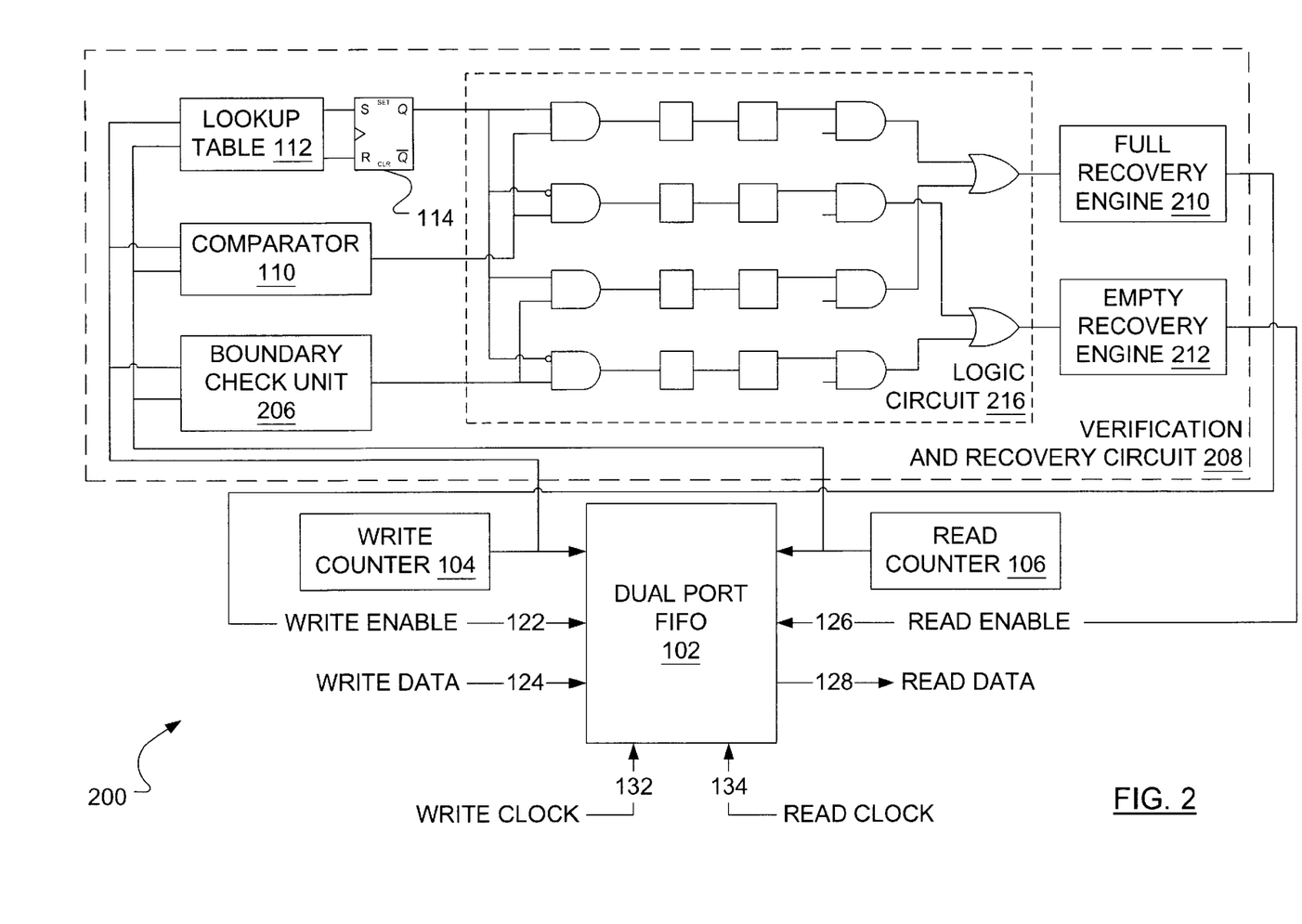
FIG. 2 illustrates an elastic store improved over the elastic store of FIG. 1 according to an embodiment of the present invention.

In an inventive elastic store 200, illustrated in FIG. 2, the FIFO 102, the write counter 104 and the read counter 106 are maintained while a verification and recovery circuit 208 replaces the verification circuit 108 of the elastic store 100 of FIG. 1. The verification and recovery circuit 208 maintains the comparator 110, the lookup table 112 and the S-R latch 114 found in the verification circuit 108 of FIG. 1 and adds a boundary check unit 206, a new logic circuit 216, a full recovery engine 210 and an empty recovery engine 212. The full recovery engine 210 connects to the write enable port 122 and, therefore, controls whether the FIFO 102 may receive data for a write operation. Meantime, the empty recovery engine 212 connects to the read enable port 126 and, therefore, controls whether the FIFO 102 may release data for a read operation.

Figure 3:
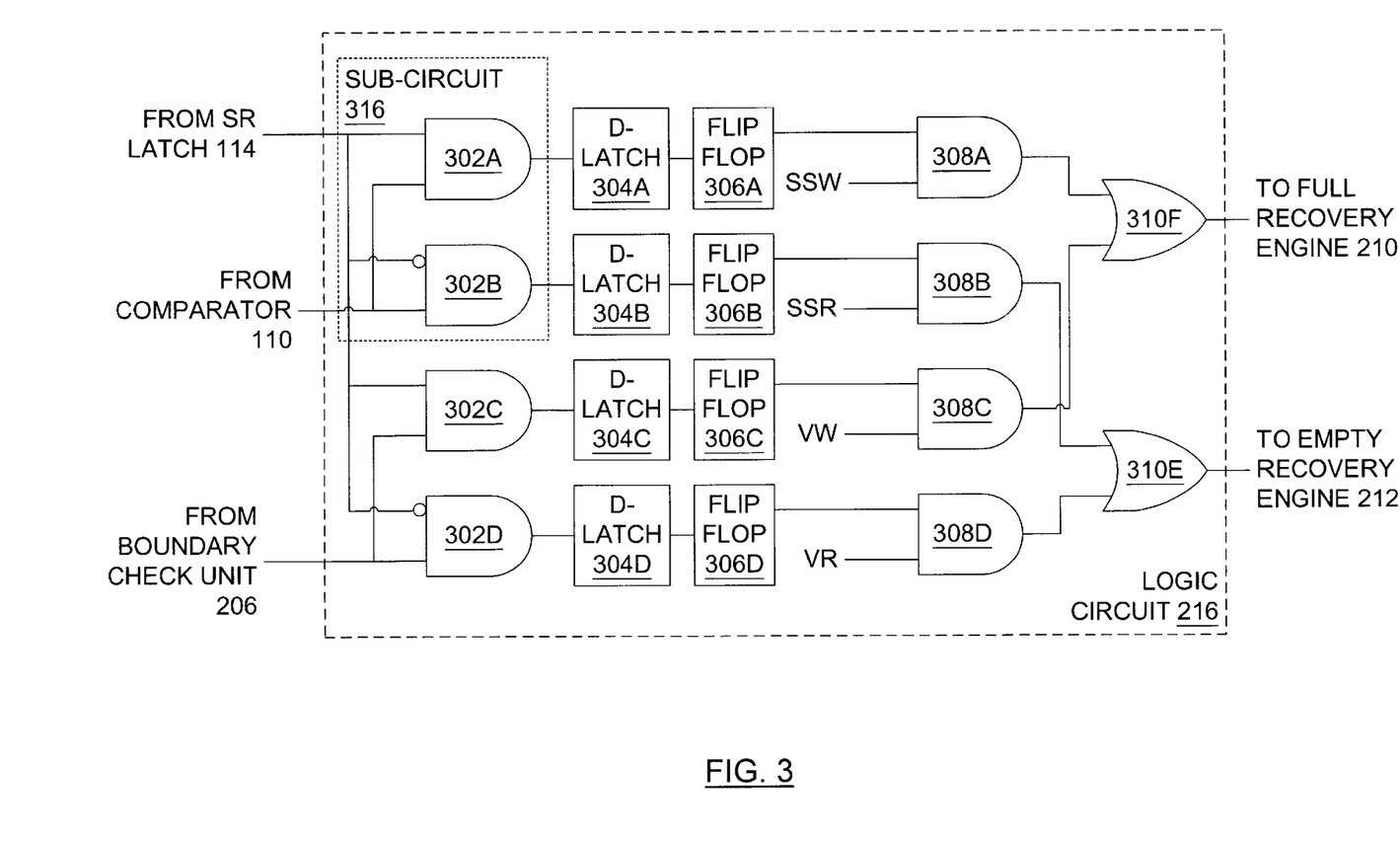
FIG. 3 illustrates a logic circuit for use in the elastic store of FIG. 2 in an embodiment of the present invention.

The new logic circuit 216 is illustrated in detail in FIG. 3. A pair of input AND gates 302A, 302B form a sub-circuit 316 that is logically identical to the logic circuit 116 of FIG. 1 for acting on the output of the S-R latch 114 and the comparator 110. A second pair of input AND gates 302C, 302D is included in the new logic circuit 216 for acting on the output of the S-R latch 114 and the boundary check unit 206. An arrangement of D-latches 304A, 304B, 304C, 304D and corresponding flip flops 306A, 306B, 306C, 306D act to maintain the output of the input AND gates 304A, 304B, 304C, 304D. Four output AND gates 308A, 308B, 308C, 308D receive the output from the flip flops along with output (SSW, SSR, VW, VR) from two finite state machines (not shown). A full OR gate 310F receives output from particular output AND gates 308A, 308C and passes results to the full recovery engine 210 (FIG. 2). An empty OR gate 310E receives output from particular output AND gates 308B, 308D and passes results to the empty recovery engine 212 (FIG. 2).

It is typical of systems including circuits like the elastic store 100 of FIG. 1 and the elastic store 200 of FIG. 2 that a phase locked loop (not shown) be included in a separate synchronization circuit (not shown) for removing noise and jitter from digital input signals. Herein, separate phase locked loops are used to remove noise and jitter from the read clock 134 and the write clock 132. Each phase locked loop provides an indication (PLL LOCKED) of phase lock to the elastic store.

Figure 4A:
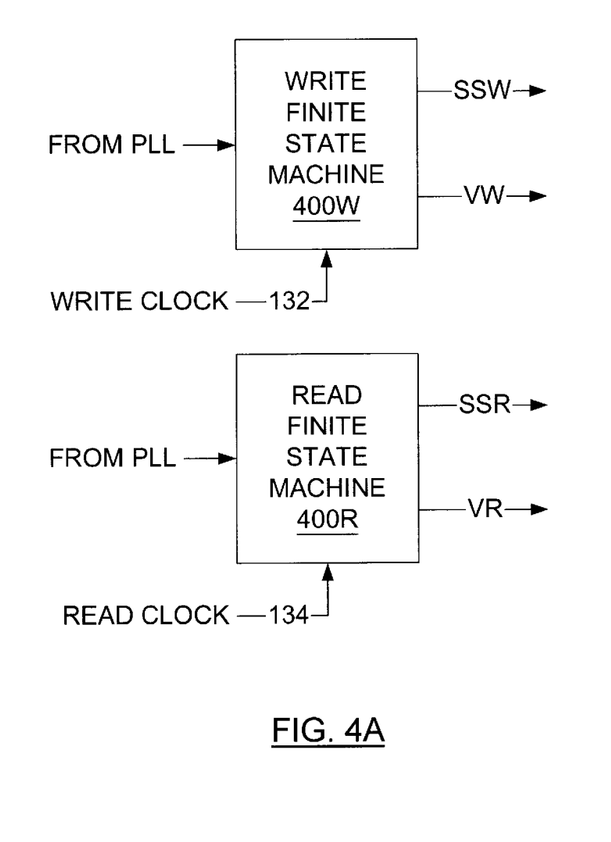
FIG. 4A illustrates a write finite state machine and a read finite state machine.
Figure 4B:
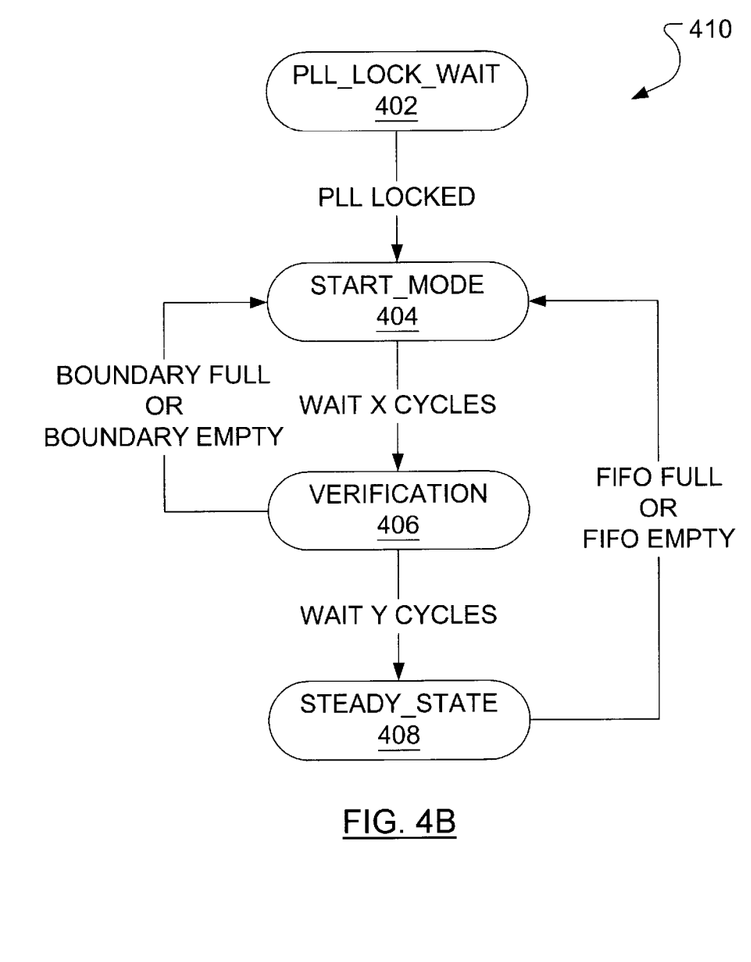
FIG. 4B illustrates the states through which the state machines of FIG. 4A may cycle.

In order to prevent race conditions (circuit behavior that depends on which input variable changes fastest) at boot-up time, the clock boundaries (the distance between the read and write addresses) must be verified. For verification purposes, one finite state machine (FSM) is used per clock domain. One FSM is responsible for write data and one FSM is responsible for read data. FIG. 4A illustrates a "write" finite state machine 400W and a "read" finite state machine 400R (generally, finite state machine 400) while FIG. 4B illustrates the states through which the state machines of FIG. 4A may cycle. In particular, in a PLL_LOCK_WAIT state 402, the finite state machine 400 is waiting for a phase locked loop (not shown) to indicate that the phase locked loop is locked to the appropriate clock (the read clock 134 or the write clock 132). The PLL_LOCK_WAIT state 402 occurs only at boot-up time or after a reset. In a START_MODE state 404, the elastic store 200 is waiting at boot-up time or after a recovery. The START_MODE state 404 lasts for X cycles of a respective clock before allowing the elastic store 200 to go into a VERIFICATION state 406. The write finite state machine 400W is associated with the write clock signal received on the write clock line 132 while the read finite state machine 400R is associated with the read clock signal received on the read clock line 134. In the VERIFICATION state 406, the elastic store 200 tracks BOUNDARY FULL or BOUNDARY EMPTY states for Y cycles of the respective clock. In a STEADY_STATE state 408 the FIFO FULL or FIFO EMPTY states are tracked.

The write finite state machine 400W outputs a high signal on a VW line when in the VERIFICATION state 406 and a high signal on a SSW line when in the STEADY_STATE state 408. The read finite state machine 400R outputs a high signal on a VR line when in the VERIFICATION state 406 and a high signal on a SSR line when in the STEADY_STATE state 408.

To avoid decoding glitches, it is known to use a grey addressing code sequence in both the write counter 104 and the read counter 106. In the FIFO 102, the addressing code sequence is irrelevant, provided that both counters use the same sequence.

Figure 5:
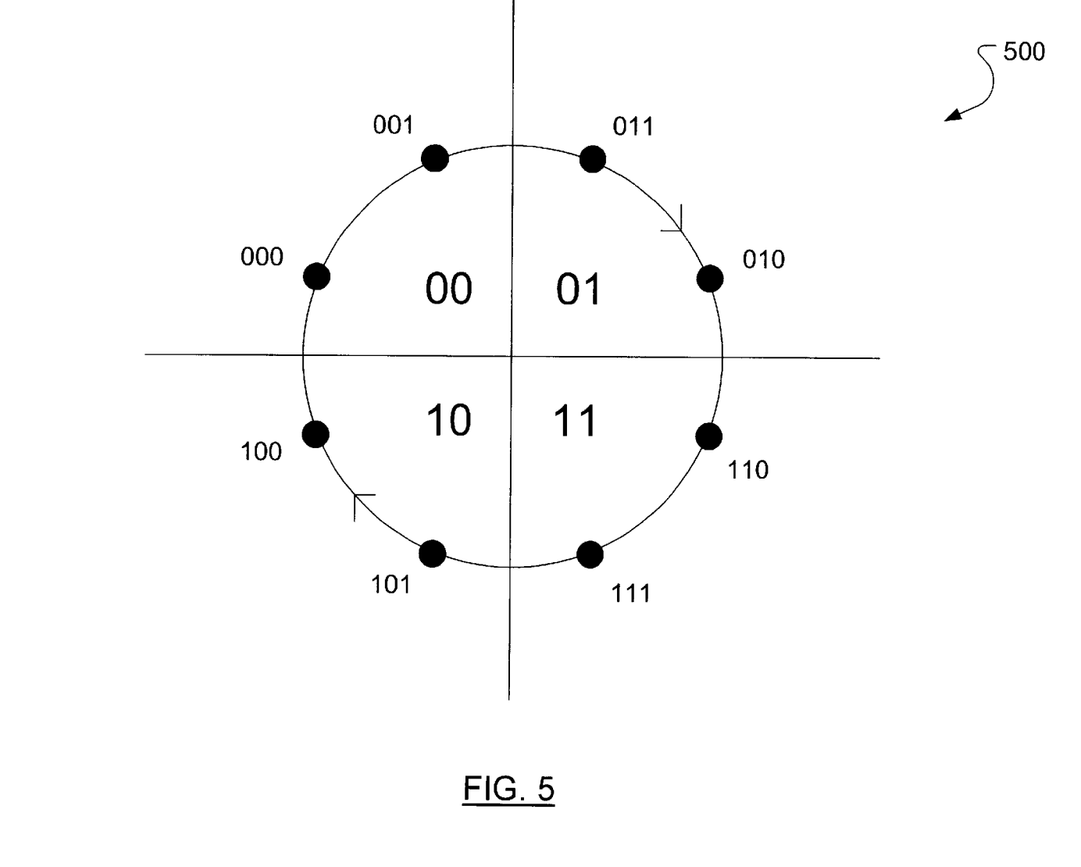
FIG. 5 illustrates quadrants and exemplary grey counter codes to which the quadrants may be associated.

A counter cycle 500, exemplary of that corresponding to an eight state (three bit) grey counter, is illustrated in FIG. 5. The number of states in a counter for an elastic store is determined by the FIFO size. In this exemplary case, the FIFO size is eight. The counter cycle 500 progresses in a clockwise direction. Quadrants are identified by the two most significant bits in each counter state.

In operation of the elastic store 100 in FIG. 1, if the elastic store 100 has a state of FIFO FULL or FIFO EMPTY, all that will be available for reading on the read data line 128 will be junk data. The states FIFO FULL and FIFO EMPTY occur when addresses supplied by the write counter 104 and the read counter 106 are equal. To distinguish between the two states, the S-R latch 114 is used and, before the addresses supplied by the write counter 104 and the read counter 106 are equal, the two most significant address bits of the write counter 104 and the read counter 106 are examined in the look-up table 112. In view of the counter cycle 500 of FIG. 5, the two most-significant bits in the counter cycle (whether the counter code is grey, binary or other) can designate an address quadrant for the state of each counter. The quadrant distance between the state of the read counter 106 and the state of the write counter 104 indicates whether the elastic store 100 is progressing TOWARDS FULL or TOWARDS EMPTY and may be termed the "direction" of the FIFO.

If a read address is one quadrant ahead of a write address, the direction of the FIFO 102 may be identified as TOWARDS EMPTY by a low signal output from the lookup table 112 and passed to the S-R latch 114. If a write address is one quadrant ahead of a read address, the direction of the FIFO 102 may be identified as TOWARDS FULL by a high signal output from the lookup table 112 and passed to the S-R latch 114. If the read address and the write address are in the same or opposite quadrants, no direction information may be learned, therefore, these scenarios are ignored.

If a read address differs a write address, an address equivalence may be identified as UNEQUAL by a low signal output from the comparator 110. If a read address is identical to a write address, an address equivalence may be identified as EQUAL by a high signal output from the comparator 110.

The output of the S-R latch 114 is representative of the direction and is thus established well before an actual state of FIFO FULL or FIFO EMPTY can occur. The output of the S-R latch 114 and the output of the comparator 110 are converted, by the logic circuit 116, into an output signal indicating a state of either FIFO FULL or FIFO EMPTY.

To declare the FIFO 102 to be in the FIFO FULL state, the direction must be identified as TOWARDS FULL (high) and the write address and the read address, as compared in the comparator 110, must be EQUAL (high). When the FIFO 102 is declared to be in the FIFO FULL state, the state is reported to an external assistance (not shown) and recovery procedures are applied by the external assistance.

To declare the FIFO 102 to be in the FIFO EMPTY state, the direction must be identified as TOWARDS EMPTY (low) and the write address and the read address, as compared in the comparator 110, must be EQUAL (high). When the FIFO 102 is declared to be in the EMPTY state, the state is reported to the external assistance and recovery procedures are applied by the external assistance.

Turning to FIG. 2, in overview, if, while in steady state operation, a FIFO FULL or FIFO EMPTY state of the FIFO 102 is detected by the new logic circuit 216, a recovery operation is initiated at either the full recovery engine 210 or the empty recovery engine 212, i.e., writing or reading is disabled for a predetermined number of respective clock cycles. Furthermore, at boot-up time, after waiting a number of clock cycles, a verification operation is performed on the boundaries (write vs. read addresses). In contrast to steady state operation, the verification operation requires that the recovery operation described above be initiated if the read and write addresses are adjacent. This additional sensitivity to the proximity of read and write addresses is necessary due to the potential instability inherent on the write clock 132 and/or the read clock 134 after a boot-up or recovery operation. Once initiated, the verification operation continues for a number clock cycles. As well as at boot-up time, the verification operation is also performed after each recovery operation.

The value for the number of respective clock cycles for which writing or reading is disabled during the recovery operation is programmable. This value may be based on the clock ratio and the number of clock cycles required to result in a half-full FIFO. That is, the number of respective clock cycles is predetermined to meet an objective of maximal distance between read and write addresses.

Although state 408 is called "STEADY STATE", the elastic store will generally be progressing either towards full or towards empty. However, while the finite state machines 400 are in the STEADY_STATE state 408 the elastic store 200 is in a more stable condition than that which exists after a boot-up or recovery operation.

The detection of the FIFO FULL or FIFO EMPTY state has been described in conjunction with FIG. 1. In the new logic circuit 216, the FIFO FULL state is only reported by output AND gate 308A to the full OR gate 310F if the SSW signal received from the read finite state machine 400W is high, indicating that the write finite state machine 400W is in the STEADY_STATE state 408. Similarly, the FIFO EMPTY state is only reported by output AND gate 308B to the empty OR gate 310E if the SSR signal received from the read finite state machine 400R is high, indicating that the read finite state machine 400R is in the STEADY_STATE state 408.

The objective of the verification operation is to avoid adjacent read and write addresses. If the read and write addresses are adjacent and one of the clocks slips, then it is possible that a false FIFO FULL or FIFO EMPTY state may be detected. Without boundary verification, it would be very difficult to debug a false FIFO FULL or FIFO EMPTY state occurring on a stable network due to a slip on one of the clocks.

The verification operation is aided by the boundary check unit 206. The output of the boundary check unit 206 is high if the read address and the write address are adjacent or if the addresses are equal, indicated by an "ADJACENT" signal. The logic performed by the input AND gates 302C, 302D that receive input from the S-R latch 114 and the boundary check unit 206 is similar to the logic performed by the sub-circuit 316.

To declare the FIFO 102 to be in a BOUNDARY FULL state, the direction must be identified as TOWARDS FULL (high) and the write address and the read address, as compared in the boundary check unit 206, must be ADJACENT (high). The BOUNDARY FULL state is maintained by the corresponding D-latch 304C and the corresponding flip flop 306C.

To declare the FIFO 102 to be in a BOUNDARY EMPTY state, the direction must be identified as TOWARDS EMPTY (low) and the write address and the read address, as compared in the boundary check unit 206, must be ADJACENT (high). The BOUNDARY EMPTY state is maintained by the corresponding D-latch 304D and the corresponding flip flop 306D.

In the new logic circuit 216, the BOUNDARY FULL state is only reported by the appropriate output AND gate 308C to the full OR gate 310F if the VW signal received from the write finite state machine 400W is high, indicating that the write finite state machine 400W is in the VERIFICATION state 406. Similarly, the BOUNDARY EMPTY state is only reported by the appropriate output AND gate 308D to the empty OR gate 310E if the VR signal received from the read finite state machine 400R is high, indicating that the read finite state machine 400R is in the VERIFICATION state 406.

When either a FIFO FULL state or a BOUNDARY FULL state is received by the full OR gate 310F, a FULL state is indicated to the full recovery engine 210 and a recovery operation is initiated by the full recovery engine 210. The recovery operation, i.e., the disabling of writing at the FIFO 102 through use of the write enable port 122, is maintained by the full recovery engine 210 for a predetermined number of write clock cycles. Further, when either a FIFO EMPTY state or a BOUNDARY EMPTY state is received by the empty OR gate 310E, an EMPTY state is indicated to the empty recovery engine 212 and a recovery operation is initiated by the empty recovery engine 212. The recovery operation, i.e., the disabling of reading at the FIFO 102 through use of the read enable port 126, is maintained by the empty recovery engine 212 for a predetermined number of read clock cycles. The duration of the recovery operation is programmable and may be, for instance, based on the clock ratio.

At boot-up time, the FSM 400W, 400R of the elastic store 200 may loop for a while (START_MODE to VERIFICATION to START_MODE and so on). The design ensures that, after some time, the elastic store 200 will recover from this instability without help from a third party. Also, concern about software resetting the elastic store 200 at an inopportune time, as can happen in other elastic store designs, is alleviated.

Advantageously, the elastic store 200 can operate without external assistance, that is, the elastic store 200 does not require help from a third party when failures occur. Furthermore, the elastic store 200 is programmable for added flexibility.

As will be apparent to a person skilled in the art, the STEADY_STATE state 408 may not be necessary, and the VERIFICATION state 406 may used in place of the STEADY_STATE state 408. However, it should be noted that a false FULL/EMPTY signal, received while in the VERIFICATION state 406 may be difficult to debug.

Other modifications will be apparent to those skilled in the art and, therefore, the invention is defined in the claims.

We claim:

1. A method of operating an elastic store, said elastic store including a First In First Out memory (FIFO) having a write address input and a read address input, said method comprising:
    determining a write address as supplied to said write address input;
    determining a read address as supplied to said read address input;
    detecting a state of said elastic store wherein said write address is adjacent to said read address; and
    responsive to said detecting said state, performing a recovery operation.

2. The method of claim 1 further comprising determining a direction of said elastic store, where said direction is one of towards full and towards empty.

3. The method of claim 2 wherein said direction is towards full and said recovery comprises disabling write operations at said FIFO.

4. The method of claim 3 wherein said elastic store includes a write finite state machine and said method further comprises determining whether said write finite state machine is in a verification state and disabling said write operations only if said write finite state machine is in said verification state.

5. The method of claim 2 wherein said direction is towards empty and said recovery comprises disabling read operations at said FIFO.

6. The method of claim 5 wherein said elastic store includes a read finite state machine and said method further comprises determining whether said read finite state machine is in a verification state and disabling said read operations only if said read finite state machine is in said verification state.

7. The method of claim 1 further comprising performing said recovery operation for a predetermined duration of time.

8. The method of claim 7 wherein said predetermined duration of time is arranged to optimize a distance between said write address and said read address.

9. The method of claim 1 wherein said detecting comprises detecting a state of said elastic store wherein said write address is adjacent or equal to said read address.

10. A verification and recovery circuit for:
    receiving a write address as supplied to a write address input of a First In First Out memory (FIFO);
    receiving a read address as supplied to a read address input of said FIFO;
    detecting a state of said elastic store wherein said write address is adjacent to said read address; and
    responsive to said detecting said state, performing a recovery operation.

11. A verification and recovery circuit comprising:
    means for receiving a write address as supplied to a write address input of a First In First Out memory (FIFO);
    means for receiving a read address as supplied to a read address input of said FIFO;
    means for detecting a state of said elastic store wherein said write address is adjacent to said read address; and
    means for performing a recovery operation.

12. An elastic store comprising:
    a First In First Out memory (FIFO) having a write address input and a read address input;
    a write counter for supplying a write address to said write address input of said FIFO;
    a read counter for supplying a read address to said read address input of said FIFO; and
    a verification and recovery circuit for:
        receiving a write address as supplied to said write address input;
        receiving a read address as supplied to said read address input;
        detecting a state of said elastic store wherein said write address is adjacent to said read address; and
        responsive to said detecting said state, performing a recovery operation.

13. The elastic store of claim 12 wherein said verification and recovery circuit comprises a look-up table for determining a direction of said elastic store, where said direction is one of towards full and towards empty, and transmitting an indication of said direction.

14. The elastic store of claim 13 wherein said verification and recovery circuit further comprises a boundary check unit for performing said detecting said state of said elastic store wherein said write address is adjacent to said read address and transmitting an indication of said state of said elastic store.

15. The elastic store of claim 14 wherein said elastic store further comprises a write finite state machine for maintaining a state of a write domain of said elastic store.

16. The elastic store of claim 15 wherein said verification and recovery circuit further comprises a logic circuit for:
    receiving said indication of said direction from said look-up table;
    receiving said indication of said state of said write domain of said elastic store from said write finite state machine;
    receiving said indication of said state of said elastic store from said boundary check unit; and generating an indication of a full state of said elastic store if:
  said direction is toward full;
  said write address is adjacent to said read address; and
  said state of said write domain is verification.

17. The elastic store of claim 16 wherein said logic circuit generates said indication of said full state of said elastic store if:
  said direction is toward full;
  said write address is equal to said read address; and
  said state of said write domain is steady state.

18. The elastic store of claim 16 further comprising a full recovery engine for receiving, from said logic circuit, said indication of said state of said elastic store and, upon receiving said indication of said full state of said elastic store, disabling write operations at said FIFO.

19. The elastic store of claim 14 wherein said elastic store further comprises a read finite state machine for maintaining a state of a read domain of said elastic store.

20. The elastic store of claim 19 wherein said verification and recovery circuit further comprises a logic circuit for:
  receiving said indication of said direction from said look-up table;
  receiving said indication of said state of said read domain of said elastic store from said read finite state machine;
  receiving said indication of said state of said elastic store from said boundary check unit; and
  generating an indication of an empty state of said elastic store if:
    said direction is toward empty;
    said write address is adjacent to said read address; and
    said state of said read domain is verification.

21. The elastic store of claim 20 wherein said logic circuit generates said indication of said empty state of said elastic store if:
  said direction is toward empty;
  said write address is equal to said read address; and
  said state of said read domain is steady state.

22. The elastic store of claim 20 further comprising an empty recovery engine for receiving, from said logic circuit, said indication of said state of said elastic store and, upon receiving said indication of said empty state of said elastic store, disabling read operations at said FIFO.

* * * * *